July 14, 1942.   J. T. LOGAN   2,289,975
GENERATOR VOLTAGE REGULATING SYSTEM
Filed Oct. 1, 1940
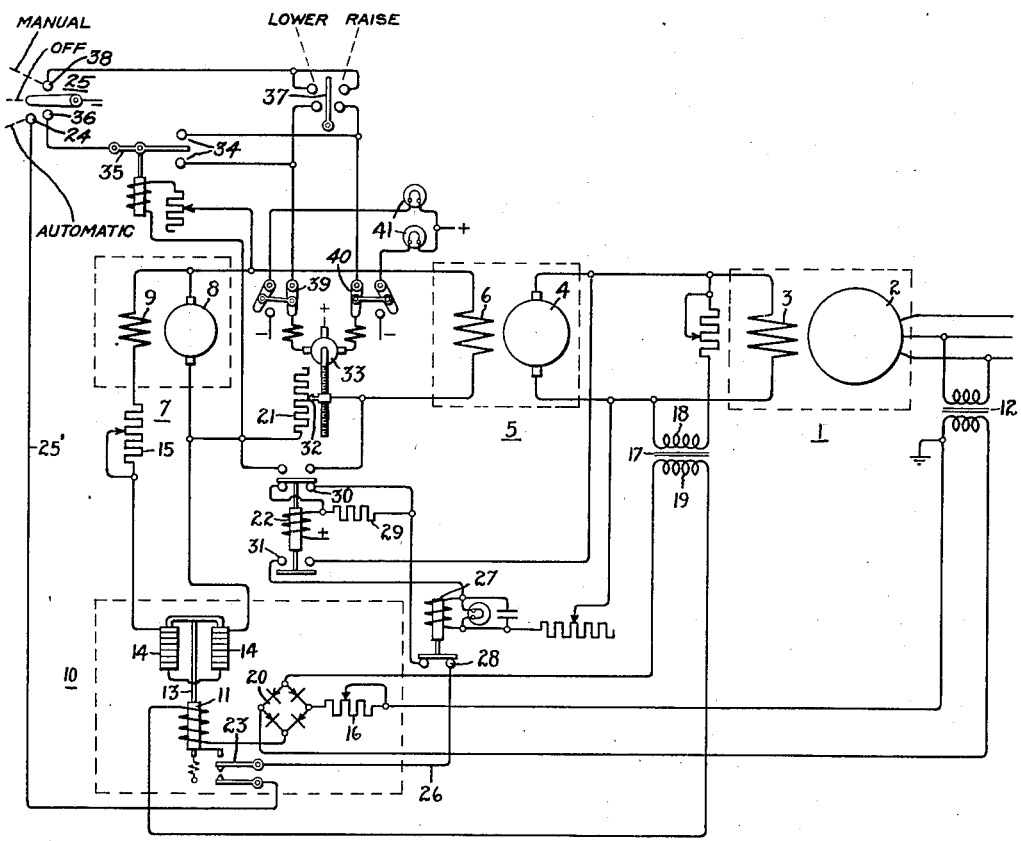
Inventor:
James Thomas Logan,
by Harry E. Dunham
His Attorney.

Patented July 14, 1942

2,289,975

UNITED STATES PATENT OFFICE 2,289,975

GENERATOR VOLTAGE REGULATING SYSTEM

James Thomas Logan, Atlanta, Ga., assignor to General Electric Company, a corporation of New York Application October 1, 1940, Serial No. 359,249

6 Claims. (Cl. 171—119)

My invention relates to voltage regulating systems and more particularly to systems of this type which control the voltage output of large alternating current generators.

The duty of a generator voltage regulator system is to supply the generator field windings with the proper amount of excitation current. The field is properly excited when the magnetism produced by the field current is of sufficient strength for maintaining the desired generator output voltage at any particular value of current within its normal range which the generator is called upon to deliver. The current required by the generator is usually of a rapidly varying nature which necessitates that the generator field strength be varied accordingly, if the generator output voltage is to remain approximately constant.

Generator voltage regulating systems commonly employed today vary the amount of generator excitation current with means actuated by the generator output voltage. A slight drop or rise in the generator output voltage is required to change the resistance in the excitation system for the generator in a direction to increase or decrease, respectively, the exciting current supplied to the generator field windings in the amounts required to hold normal generator output voltage.

My invention differs from voltage regulating systems commonly employed today principally in the relationship or organization of the elements for varying the excitation current and it is characterized by a direct acting rheostatic type voltage regulator for controlling the voltage of a self-excited pilot exciter in combination with a stabilizing or anti-hunting system which responds to the voltage of a main exciter.

An object of my invention is to provide a generator voltage regulating system which is simple and inexpensive.

Another object of my invention is to provide a new and improved generator voltage regulating system whose corrective responses are greatly amplified before reaching the generator field windings.

Another object of my invention is to increase the speed of response of the excitation during severe voltage disturbances and thereby improve the performance of the generator during times of, and immediately following, power system disturbances usually caused from short circuits.

Other objects and advantages of my invention will be apparent from the following description taken in connection with the accompanying drawing and its scope will be pointed out in the appended claims.

Referring now to the single figure of the accompanying drawing, which illustrates diagrammatically a preferred embodiment of my invention, I show therein a main generator 1 which is provided with an armature 2 and a field winding 3. This generator is shown by way of example as a three-phase alternator. The field winding 3 is separately excited from the armature 4 of a separately excited main exciter 5, which is provided with a field winding 6, which in turn is excited by a self-excited pilot exciter 7 having an armature 8 connected to the main exciter field winding 6 and having a shunt field winding 9.

The voltage of alternator 1 is automatically maintained at a predetermined normal value by means of a voltage regulator 10. This regulator is of the direct acting rheostatic type, such for example, as the type described in Thompson Patent 2,136,257. Such regulators consist of an electromagnetic operating means 11 in the form of a solenoid or torque motor connected to be energized in proportion to the voltage of the main generator. As shown the magnet 11 is connected across the output terminals of the main generator armature by means of a potential transformer 12. The electromagnetic means is arranged by suitable mechanical connections 13 to operate directly a variable resistance or rheostat 14 which is connected in the shunt field circuit of the pilot exciter 7. Also connected in series with the shunt field circuit of the pilot exciter is a conventional manually adjustable field rheostat 15.

For controlling the setting or voltage level held by the regulator 10, a rheostat 16 is connected in series with the operating electromagnet.

For preventing the regulator from hunting or overshooting there is provided a stabilizer 17 consisting of a transformer, one of whose windings 18 is connected across the armature of the main exciter 4 and therefore, also across the field winding 3 of the main generator, and the other of whose windings 19 is connected so as to influence the energization of the magnet 11. As shown, this is connected in series with the magnet 11 across the output terminals of a full wave rectifier 20 whose input terminals are connected to the secondary winding of the potential transformer 12.

In order to insure very rapid increases in excitation of the main generator in case its voltage should fall substantially below its normal value, auxiliary forcing means is provided. This consists of a resistor 21 connected in series between the armature 8 of the pilot exciter and the field winding 6 of the main exciter, together with means for short circuiting this resistor. This latter means comprises a normally open relay 22 which is energized to close its contacts by means of a set of auxiliary contacts 23 which are closed by the electromagnetic means 11 when the voltage of the main generator falls substantially below its normal value. The operating circuit for this means is from one side of a suitable source of supply current (not shown) through a contact 24 on a manually operable control-transfer switch 25, which contact is closed when the switch is in its automatic position, then through conductor 25', contacts 23, a conductor 26 and through the relay 22, to the other side of the source of control current.

In order to prevent the above-described excitation forcing means from raising the voltage of the main exciter 5 to such a high value as to be injurious to it, as might be the result if the forcing means were allowed to operate too long, I provide automatic over-voltage protective means. This means consists of a normally closed voltage relay 27 whose operating winding is connected across the armature of the main exciter. This relay has a set of contacts 28 which are serially connected with the operating winding of the forcing relay 22. The relay 27 is so proportioned that contacts 28 open when the voltage of the main exciter 5 rises to a dangerously high value.

In order to insure very rapid operation of the forcing relay 22, while at the same time preventing it from drawing an excessive current after it is operated, there is provided a resistor 29 connected in series with its operating winding, and the relay is provided with a set of auxiliary contacts 30 which are closed when the relay is de-energized and which are connected to short circuit the resistor 29. Consequently, upon the closure of the contacts 23 a heavy inrush of current is permitted to flow through the operating winding of the relay 22, but as soon as it closes its main contacts it opens its contacts 30, thereby decreasing the current in its operating winding to a value little more than sufficient to hold its main contacts closed.

In order to insure immediate resetting of the main exciter overvoltage protective relay 27, the forcing relay 22 is provided with a second auxiliary set of contacts 31 connected in series with the overvoltage relay 27. These contacts are normally open and they close when the forcing relay 22 is energized. Consequently, whenever the main exciter overvoltage relay 27 operates to de-energize the forcing relay, an opening of its contacts 31 will immediately reset the relay 27.

I have found that during certain conditions of operation as, for example, when there is a very light load on the main generator, the voltage of the pilot exciter 7 is lowered to such a low value that it will not build up its voltage rapidly enough when it is called upon to do so by the regulator. This is because the resistance 14 during light load conditions is so high that the pilot exciter is operating at a relatively low point on its magnetization characteristic with the result that there is very little armature voltage available for forcing a rapid increase in shunt field current through the inductance of the field winding when the resistance 14 is substantially decreased. This sluggish response is often objectionable from the point of view of stability in case the generator 1 is a synchronous machine which is connected to other synchronous machines.

I eliminate this tendency to sluggishness by suitable means for preventing the pilot exciter voltage from falling to such a low value that it interferes with its ability to build up its voltage rapidly. The means which I employ consists essentially of a variable resistor connected serially between the armature of the pilot exciter and the field winding of the main exciter, and which resistor is controlled in such a manner that when the exciter voltage tends to fall below a predetermined safe value, the resistance is increased. This has the effect of decreasing the excitation of the main machine, thus further reducing its voltage which then causes the regulator to raise the pilot exciter voltage so that in this manner the pilot exciter voltage is prevented from falling too low. The resistor for this purpose may conveniently be combined with the forcing resistor 21 and, as shown, I provide a movable contact 32 operated by a reversible servo-motor 33 for converting the resistor 21 into a motor operated rheostat. The operation of the rheostat motor 33 is controlled by a set of contacts 34 of a voltage relay 35 which is connected to respond to the pilot exciter voltage, the arrangement being such that if the pilot exciter voltage falls below a predetermined safe value for quick response, the contacts 34 will energize the motor 33 in such a direction as to increase the effective value of the resistance 21.

Sometimes the voltage of the pilot exciter becomes too high, or the load on, or other operating conditions of, the main generator 1 become such that the main voltage regulator 10 cannot prevent the voltage from falling, even with all of the resistance 14 cut out of the field circuit of the pilot exciter. This latter state of affairs corresponds to maximum pilot exciter voltage, and in order either to prevent overvoltage of the pilot exciter or to extend the range of regulator operation, the pilot exciter voltage relay 35 is arranged to operate the contacts 34 in such a manner as to reverse the motor 33 and decrease the effective value of the resistance 21, thereby relieving a certain amount of duty on the main voltage regulator and the pilot exciter. The energizing circuit for the motor 33 through the contacts 34 is controlled by another set of contacts 36 on the transfer switch 25.

It is often desirable to be able to adjust the voltage of the main generator manually, and for this purpose a manual control switch 37 is provided. This switch is, in effect, connected in parallel with the contacts 34 of the pilot exciter voltage relay 35 except that its common supply terminal is energized through a set of contacts 38 on the transfer switch. This set of contacts 38 is closed when the transfer switch is in its hand or manual position.

The motor 33 is provided with conventional limit switches 39 and 40 which are arranged to prevent overtravel of the motor and also selectively to energize red and green signal lights 41 for indicating the direction of operation of the motor.

The operation of the forcing relay 22, the overvoltage protection relay 27 for the main exciter and the pilot exciter voltage limiting relay 35 has already been described. The general operation of the automatic voltage regulating system is as follows. Any change in voltage of the armature 2 is transmitted to the regulator operating coil 11 through the potential transformer 12 and the rectifier 20. If the voltage decreases the resistance 14 is decreased and if the voltage increases the resistance 14 is increased thereby varying the current in the shunt field winding 9 of the pilot exciter. The change in pilot exciter voltage changes the current in the main exciter field winding, thereby changing the main exciter voltage with the result that the main generator excitation is varied in the proper direction and in the proper amount to maintain the main generator voltage substantially constant.

The advantage of placing the regulating resistance 14 in the field circuit of the pilot exciter is that a very much smaller voltage regulating resistance can thereby be used to control the voltage of a main generator. For example, in a specific application which I have made of my invention the main generator has a rating of 60,000 kilowatts, the main exciter has a rating of 200 kilowatts and the pilot exciter has a rating of 4 kilowatts. The regulator 10 therefore has to handle only the field current for a 4 kilowatt pilot exciter while in a conventional voltage regulating system in which the regulating resistance is in the field circuit of the main exciter the regulating resistance would have to handle the field current of a 200 kilowatt machine. Thus, by taking advantage of the inherent amplification factor between the field current and the armature current of pilot exciter 7 I am able to employ apparatus whose current carrying capacity is only a small percentage of the current carrying capacity of the apparatus employed in conventional voltage regulating system. Furthermore, it is seen that in my voltage regulating system two stages of amplification are employed between the regulator 10 and the main generator field 3, the pilot exciter 7 being the first stage and the main exciter 5 being the second stage.

The anti-hunting transformer 17 responds to any change in main exciter voltage in such a manner that it induces a transient voltage in its secondary winding 19 which is proportional to the rate of change of main exciter voltage and which is of such polarity as to oppose the action of the voltage regulator in producing this change in main exciter voltage. By connecting the stabilizing or anti-hunting transformer 17 across the output terminals of the main exciter it is more effective as a stabilizer because the voltage output of the pilot exciter is allowed to swing over a broader range due to the time constant of the main exciter. In other words, the pilot exciter is allowed to overcorrect its voltage, thus increasing the speed of response of the excitation system and in so doing it compensates to a large degree for the time constant of the main exciter.

By separating the rheostatic regulating means 14 and the forcing resistor 20 and by placing them in different field circuits it is possible to use simpler and less expensive resistance means in each case. Also, regulating rheostat 14, being removed from the main exciter field circuit, is reduced in size to the extent that its resistance value can be changed almost instantly by means of a direct mechanical connection to the operating electromagnetic means 11.

I have found that with my invention it is unnecessary to have auxiliary means for forcing the excitation downward in case of overvoltage. This is because when the excessive voltage output of the main generator 1 is reflected through the potential transformer 12 to the regulator 10 the full resistance value 14 is instantly inserted in field circuit 9 of the pilot exciter. This reduces the pilot exciter voltage practically instantly to a very low value, just slightly above residual voltage, thus reducing the current in the field 6 to almost zero amperes. This obviously reduces the output voltage of the main exciter armature to residual value, practically speaking, thus quickly weakening the strength of field 3 to a value required for producing normal output voltage of the main generator. When normal voltage is restored regulator 10 instantly changes the resistance of 14 to a value necessary to restore the output voltage of pilot exciter 7 to the value required to enable the main exciter 5 to supply the proper field strength to the generator 1.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a main separately excited generator, a main separately excited exciter for said generator, a self-excited pilot exciter for said main exciter, an automatic voltage regulator for said main generator comprising rheostatic means in the self-excitation circuit of said pilot exciter, electromagnetic means responsive to the voltage of said main generator for directly operating said rheostatic means in such a manner as to maintain said voltage at a normal value, a second rheostatic means connected in the separate excitation circuit of said main exciter, and means for controlling said second rheostatic means so as to keep the voltage of said pilot exciter within the portion of its saturation curve which gives the highest rates of voltage change and which is substantially above its residual voltage.

2. In combination, a main separately excited generator, a main separately excited exciter for said generator, a self-excited pilot exciter for said main exciter, an automatic voltage regulator for said main generator comprising rheostatic means in the self-excitation circuit of said pilot exciter, electromagnetic means responsive to the voltage of said main generator for directly operating said rheostatic means in such a manner as to maintain said voltage at a normal value, a second rheostatic means connected in the separate excitation circuit of said main exciter, and automatic means responsive to the voltage of said pilot exciter for operating said second rheostatic means in such a manner as to maintain the pilot exciter voltage within the portion of its saturation curve which gives the highest rates of voltage change and which is substantially above its residual voltage.

3. In combination, a main separately excited generator, a main separately excited exciter for said generator, a self-excited pilot exciter for said main exciter, an automatic voltage regulator for said main generator comprising rheostatic means in the self-excitation circuit of said pilot exciter, electromagnetic means responsive to the voltage of said main generator for directly operating said rheostatic means in such a manner as to maintain said voltage at a normal value, a resistor in the excitation circuit of said main exciter, and means controlled by said electromagnetic means when the voltage of said main generator falls substantially below said normal value for quickly short circuiting said resistor in one step.

4. In combination, a main separately excited generator, a main separately excited exciter for said generator, a self-excited pilot exciter for said main exciter, an automatic voltage regulator for said main generator comprising rheostatic means in the self-excitation circuit of said pilot exciter, electromagnetic means responsive to the voltage of said main generator for directly operating said rheostatic means in such a manner as to maintain said voltage at a normal value, a second rheostatic means connected in the separate excitation circuit of said main exciter, automatic means responsive to the voltage of said pilot exciter for operating said second rheostatic means in such a manner as to maintain the pilot exciter voltage above a predetermined minimum value within the range of its ability rapidly to increase its voltage when called upon to do so by said regulator, and means controlled by said electromagnetic means when the voltage of said main generator falls substantially below said normal value for substantially instantaneously short circuiting said second rheostatic means in one step.

5. In combination, a main separately excited generator, a main separately excited exciter for said generator, a self-excited pilot exciter for said main exciter, an automatic voltage regulator for said main generator comprising rheostatic means in the self-excitation circuit of said pilot exciter and electromagnetic means responsive to the voltage of said main generator for directly operating said rheostatic means in such a manner as to vary the pilot exciter voltage gradually as required to maintain normal generator voltage, a second rheostatic means connected in the separate excitation circuit of said main exciter, means responsive to the voltage of said pilot exciter for automatically controlling said second rheostatic means in such a manner as normally to maintain the said pilot exciter voltage in the range of its ability to change at substantially its maximum rate when called upon to do so by said voltage regulator, means actuated by said voltage regulator for forcing the main exciter voltage above normal by short circuiting in one step said second rheostatic means when the main generator voltage drops substantially below normal, and means responsive to a predetermined main exciter overvoltage for intermittently interrupting the forcing action of said voltage regulator so as to limit the main exciter overvoltage to a value which is slightly below that which will cause injury thereto for the duration of a condition of substantial undervoltage of said main generator.

6. In combination, a main generator, an excitation system therefor, an automatic voltage regulator system for controlling said excitation system so as to maintain substantially constant generator voltage, said regulator system including forcing means which produces relatively quick excitation increases by means of relatively high excitation system voltages, over-voltage protective means for said excitation system which interrupts said forcing means when the excitation system voltage reaches a predetermined value, and means responsive to the operation of said forcing means for rendering said protective means operative, said last-mentioned means being responsive to the interruption of said forcing means for rendering said protective means inoperative and thus re-establishing the operation of said forcing means.

JAMES THOMAS LOGAN.